United States Patent [19]

Ando et al.

[11] Patent Number: 5,688,876
[45] Date of Patent: Nov. 18, 1997

[54] CURABLE EPOXY RESIN COMPOSITION CURED WITH A MANNICH BASE

[75] Inventors: Kazuhiko Ando; Hiroshi Suzuki, both of Tokyo, Japan

[73] Assignee: Asahi Denka Kogyo K.K., Tokyo, Japan

[21] Appl. No.: 687,002

[22] Filed: Jul. 18, 1996

[30] Foreign Application Priority Data

Jul. 28, 1995 [JP] Japan ................... 7-193253

[51] Int. Cl.⁶ ................... C08G 8/28; C08L 61/06
[52] U.S. Cl. ................... 525/504; 525/523; 528/99
[58] Field of Search ................... 525/504, 523; 528/99

[56] References Cited

U.S. PATENT DOCUMENTS

| | | | |
|---|---|---|---|
| 4,000,116 | 12/1976 | Renner | 260/47 |
| 4,188,312 | 2/1980 | Kempter et al. | 525/109 |
| 4,361,660 | 11/1982 | Streitberger et al. | 523/404 |
| 4,444,634 | 4/1984 | Kempter et al. | 525/504 |
| 4,904,404 | 2/1990 | Liu et al. | 525/380 |
| 5,055,168 | 10/1991 | Lawrenz et al. | 204/181 |
| 5,578,685 | 11/1996 | Neumann et al. | 525/504 |

FOREIGN PATENT DOCUMENTS

| | | |
|---|---|---|
| 351365 | 9/1993 | European Pat. Off. . |
| 68243 | 9/1993 | European Pat. Off. . |
| 58-187462 | 9/1993 | Japan . |
| 1118635 | 9/1993 | U.S.S.R. . |

Primary Examiner—Randy Gulakowski
Attorney, Agent, or Firm—Flynn, Thiel, Boutell & Tanis, P.C.

[57] ABSTRACT

A curable epoxy resin composition comprising (I) an epoxy resin having more than one epoxy groups per one molecule, and (II) a specific Mannich base as essential components, with the amount of the Mannich base (II) being 1 to 50 parts by weight per 100 parts by weight of the epoxy resin (I), is lowly odoriferous and therefore easy of handling, is excellent in low-temperature curing characteristics, and its cured product exhibits excellent resistances to water, chemicals and amine blushing, and excellent physical properties.

1 Claim, No Drawings

CURABLE EPOXY RESIN COMPOSITION CURED WITH A MANNICH BASE

BACKGROUND OF THE INVENTION

1. Field of the Invention

The present invention relates to a curable epoxy resin composition, a curing agent and a curing composition.

2. Description of the Related Art

Epoxy resins curable at ordinary temperatures are required to be speedily curable even under undesirable conditions of low temperature in winter, high humidity, application to wet surface or the like as well as to be excellent in physical properties, when they are used in fields of coating materials, civil engineering works and construction and so on.

Up to this time, aliphatic polyamines, polyamides, aromatic polyamines, alicyclic polyamines, aminated aliphatic alcohols and phenols, and adducts of these polyamines with low-molecular epoxides having oxirane oxygen have been used as curing agents for curing epoxy resins curable at ordinary temperatures. However, the curing of such the epoxy resin with such the curing agent can be attained at a temperature generally of 10° C. or above, usually in the range of from 20° to 40° C. In curing an epoxy resin at a temperature of 10° C. or below, particularly 5° C. or below, in winter, it has been a common practice to use a modified curing agent selected from among products of masking of the above polyamines with various phenols, products of modification of the polyamines with Mannich bases, and so forth. However, the use of such a modified curing agent also has failed in attaining satisfactory curing at a low temperature. Further, it has also been a common practice in curing an epoxy resin at a low temperature to use a tertiary amine such as dimethylaminomethylphenol as a curing catalyst together with the above modified curing agent. However, it is difficult to handle such the curing catalyst due to its strong odor, and the use of such the curing catalyst can not attain satisfactory curing at a low temperature and gives a very brittle cured resin unsuitable for practical use. These disadvantages have become problematic also to water-based curable epoxy resin compositions which have recently been noted as substitutes for solvent-based curable epoxy resin compositions.

Under these circumstances, it has been expected to develop a curable epoxy resin composition which is reduced in odor, is easy of handling, exhibits excellent low-temperature curing characteristics, can cure under severe conditions, e.g., in water, and can give a cured product having excellent resistances to water, amine blushing and chemicals and excellent physical properties, and a curing agent therefor.

DISCLOSURE OF THE INVENTION

Summary of the Invention

An object of the present invention is to provide a curable epoxy resin composition which is lowly odoriferous and therefore easy of handling, is excellent in low-temperature curing characteristics, and can give a cured product having excellent resistances to water, chemicals and amine blushing and excellent physical properties.

Another object of the present invention is to provide a curing agent and a curing agent composition which are suitable for curing, at ordinary temperatures including low temperatures, epoxy resins in aqueous system as well as in solvent systems.

The present inventors have extensively studied for attaining the above-mentioned objects. As the result of the studies, they have succeeded to provide a curable epoxy resin composition, a curing agent and a curing composition according to the present invention.

Thus, the present invention provides a curable epoxy resin composition comprising:

(I) an epoxy resin having more than one epoxy groups per one molecule, and (II) a Mannich base prepared by reacting (II-①) an aromatic compound having at least one phenolic hydroxyl group in the molecule with (II-②) a carbonyl compound having at least one carbonyl group in the molecule and (II-③) an amino compound represented by the formula:

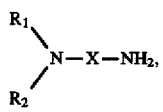

wherein $R_1$ and $R_2$ each represents an alkyl group having 1 to 5 carbon atoms, and X represents an alkylene group having 1 to 5 carbon atoms, at a molar ratio of (II-①)/(II-②)/(II-③) of 1/(0.1 to 3.0)/(0.1 to 3.0) and a molar ratio of (II-②)/(II-③) of 1/(1.0 to 2.0);

wherein the amount of the Mannich base (II) is 1 to 50 parts by weight per 100 parts by weight of the epoxy resin (I).

In other words, the present invention relates to a curable epoxy resin composition comprising, as essential components, (I) an epoxy resin composition having on the average more than one epoxy groups in the molecule, and (II) a Mannich base composition obtained by reacting (II-①) a phenol having at least one phenolic hydroxyl group in the molecule with (II-②) a carbonyl compound having at least one carbonyl group in the molecule and (II-③) an amino compound represented by the formula:

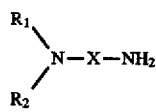

(wherein $R_1$ and $R_2$ each represents an alkyl group having 1 to 5 carbon atoms; and X represents an alkylene group having 1 to 5 carbon atoms) at such ratios that the carbonyl compound (II-②) and the amino compound (II-③) are 0.1 to 3.0 mol and 0.1 to 3.0 mol respectively per 1 mol of the phenol (II-①) and that the amino compound (II-③) is 1.0 to 2.0 mol per 1 mol of the carbonyl compound (II-②), at such a ratio that the Mannich base compound (II) is 1 to 50 parts by weight per 100 parts by weight of the epoxy resin composition (I).

Further, the present invention provides a curable epoxy resin composition comprising the above-mentioned epoxy resin (I), the above-mentioned Mannich base (II) and (IV) an active amino compound having at least two $NH_2$ groups, at least two NH groups, or at least one $NH_2$ group and at least one NH group in the molecule, wherein the amounts of the Mannich base (II) and the active amino compound (IV) are 1 to 30 parts by weight and 5 to 200 parts by weight respectively, per 100 parts by weight of the epoxy resin (I).

Furthermore, the present invention provides the above-mentioned Mannich base (II) as a curing agent.

In addition, the present invention provides a curing composition comprising the above-mentioned Mannich base (II)

and the above-mentioned active amino compound (IV) at a weight ratio of the Mannich base (II)/the active amino compound (IV) of (1 to 30)/(5 to 200).

The present invention will now be described in detail.

DETAILED DESCRIPTION OF THE INVENTION

The epoxy resin (I) to be used in the present invention is an epoxy resin having at least two epoxy groups, or an epoxy resin mixture having, on the average, more than one epoxy groups per one molecule. The epoxy resin mixture may comprise an epoxy resin having one epoxy group and the other epoxy resin having at least two epoxy groups, or may comprise at least two epoxy resins each having at least two epoxy groups. In the present invention, known epoxy resins may be used, as long as the epoxy resin has two or more epoxy groups or the mixture of the known epoxy resins has, on the average, more than one epoxy groups per one molecule.

Examples of such epoxy resins include epoxy resins each having at least one 1,2-epoxy group, i.e., terminal epoxy group, in the molecule; epoxidized polyunsaturated compounds; and other known epoxy resins each having at least one vicinal epoxy group, i.e., an epoxy group wherein two carbon atoms to which oxygen atom is bonded are directly bonded to each other.

Preferable examples of the epoxy resins each having at least one terminal epoxy group in the molecule include epoxy resins (I-1) each having at least one substituted or unsubstituted glycidyl ether group (i.e., substituted or unsubstituted 2,3-epoxy-propyloxy group) in the molecule, epoxy resins (I-2) each having at least one substituted or unsubstituted glycidyl ester group (i.e., substituted or unsubstituted 2,3-epoxypropyloxycarbonyl group) in the molecule and epoxy resins (I-3) each having at least one N-substituted, substituted or unsubstituted 2,3-epoxypropyl group (i.e., substituted or unsubstituted 2,3-epoxypropylamino group) in the molecule.

Still more preferable examples of the epoxy resins (I-1) have each a substituted or unsubstituted glycidyl ether group represented by the formula:

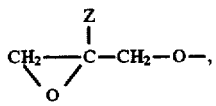

wherein Z represents a hydrogen atom, a methyl group or an ethyl group. Still more preferable examples of the epoxy resins (I-2) have each a substituted or unsubstituted glycidyl ester group represented by the formula:

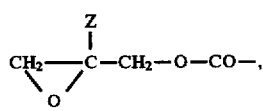

wherein Z is as defined above. Still more preferable examples of the epoxy resins (I-3) have each an N-substituted, substituted or unsubstituted 2,3-epoxypropyl group represented by the formula:

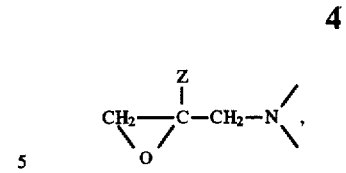

wherein Z is as defined above.

The above epoxy resin (I-1) is prepared by, for example, a reaction through which a phenolic hydroxyl group(s) of an aromatic compound having a phenolic hydroxyl group(s) or an alcoholic hydroxyl group(s) of an alcohol compound is(are) converted into a glycidyl ether group. Specific examples of the epoxy resins (I-1) include (I-1-1) polyglycidyl ethers of polyhydric aromatic compounds (preferably polyhydric phenols) each having at least one aromatic ring and at least two phenolic hydroxyl groups; (I-1-2) polyglycidyl ethers of polyhydric, aromatic alcohols (i.e., alcoholic polyhydroxyl compounds) prepared by the addition reaction of polyhydric aromatic compounds (preferably polyhydric phenols) each having at least one aromatic ring and at least two phenolic hydroxyl groups with alkylene oxides each having 2 to 4 carbon atoms; and (I-1-3) polyglycidyl ethers of polyhydric aliphatic (including alicyclic) alcohols (i.e., aliphatic polyhydroxyl compounds).

The polyglycidyl ether of a polyhydric aromatic compound (I-1-1) may be prepared, for example, by reacting (A) a polyhydric aromatic compound having at least one aromatic ring and at least two phenolic hydroxyl groups with (b) an epihalohydrin in the presence of an equivalent amount of sodium hydroxide as a basic catalyst and a basic compound in a conventional manner; or by reacting (A) a polyhydric aromatic compound having at least one aromatic ring and at least two phenolic hydroxyl groups with (b) an epihalohydrin in the presence of a catalytic amount of a basic catalyst such as triethylamine in a conventional manner to form a polyhalohydrin ether and reacting this polyhalohydrin ether with a basic compound such as sodium hydroxide.

The polyglycidyl ether of a polyhydric aromatic alcohol (I-1-2) may be prepared, for example, by reacting (B) a polyhydric aromatic alcohol prepared by the addition reaction of a polyhydric aromatic compound having at least one aromatic ring and at least two alcoholic hydroxyl groups with a an alkylene oxide having 2 to 4 carbon atoms with (b) an epihalohydrin in the presence of a catalytic amount of an acid catalyst such as boron trifluoride in a conventional manner to form a polyhalohydrin ether and reacting this polyhalohydrin ether with a basic compound such as sodium hydroxide. Similarly, the polyglycidyl ether of a polyhydric aliphatic alcohol (I-1-3) may be prepared, for example, by reacting (C) a polyhydric aliphatic alcohol with (b) an epihalohydrin in the presence of a catalytic amount of an acid catalyst such as boron trifluoride in a conventional manner to form a polyhalohydrin ether and reacting this polyhalohydrin ether with a basic compound such as sodium hydroxide.

Examples of the polyhydric aromatic compounds (A) include (A-1) monocyclic (i.e., mononuclear) polyhydric aromatic compounds each having one aromatic ring, preferably a benzene ring, and (A-2) polycyclic (i.e., polynuclear) polyhydric aromatic compounds each having two or more aromatic rings, preferably benzene rings. The polycyclic polyhydric aromatic compounds (A-2) include those having at least one condensed ring, and ring assemblies. The polyhydric aromatic compound (A) may contain a heteroatom(s) such as nitrogen atom, sulfur atom, oxygen atom in the molecule.

Specific examples of the monocyclic polyhydric aromatic compound (A-1) include resorcinol, hydroquinone, pyrocatechol, phloroglucinol, 1,5-dihydroxynaphthalene, 2,7-dihydroxynaphthalene and 2,6-dihydroxynaphthalene.

Examples of the polycyclic polyhydric aromatic compounds (A-2) include polycyclic dihydric aromatic compounds represented by the following formula:

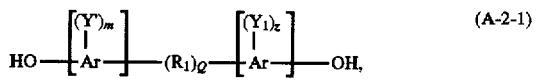

wherein Ar represents an aromatic ring; $R_1$ is a divalent group; Q is 0 or 1; m and z may be the same or different from each other and are each an integer of from 0 up to the maximum number of the hydrogen atoms on the aromatic ring (Ar) which can be replaced by substituents; and Y'(s) and $Y_1$(s) are substituents.

In the above formula (A-2-1), two Ar's may be the same or different from each other and are each an aromatic divalent hydrocarbon group such as a naphthylene group and a phenylene group. From the standpoint of the object of the present invention, there is preferable that two Ar's are phenylene groups. Y'(s) and $Y_1$(s) are each independently an alkyl group, a halogen atom, an alkoxyl group or an alkoxy-alkyl group. Examples of the alkyl groups include methyl group, n-propyl group, n-butyl group, n-hexyl group and n-octyl group, and preferred are alkyl groups each having 1 to 4 carbon atoms. Examples of the halogen atoms include chlorine atom, bromine atom, iodine atom and fluorine atom. Examples of the alkoxyl groups include methoxy group, ethoxy group, n-butoxy group and amyloxy groups, and preferred are alkoxy groups each having 1 to 4 carbon atoms. Examples of the alkoxyl groups include those having 2 to 4 carbon atoms in total, such as methoxymethyl group and ethoxyethyl group. When substituents other than hydroxyl groups are present on either or both of the above aromatic divalent hydrocarbon groups, these substituents may be the same or different from each other. $R_1$ is a divalent group, and examples thereof include

—$SO_2$—, —(S)$_n$— (wherein n is an integer of 2 to 6), alkylene groups, alkylidene groups, divalent alicyclic groups, halogenated alkylene groups, halogenated alkylidene groups, halogenated divalent alicyclic groups, alkoxy- or aryloxy-substituted alkylidene groups, alkoxy- or aryloxy-substituted alkylene groups, alkoxy- or aryloxy-substituted divalent alicyclic groups, aralkylene groups, divalent aromatic groups, halogenated divalent aromatic groups, alkoxy- or aryloxy-substituted divalent aromatic groups, alkyl-substituted divalent aromatic groups, groups represented by the formula:

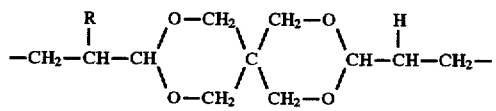

(wherein R is a hydrogen atom, a halogen atom or an alkyl group having 1 to 6 carbon atoms), and other divalent hydrocarbon groups such as those represented by the formulae:

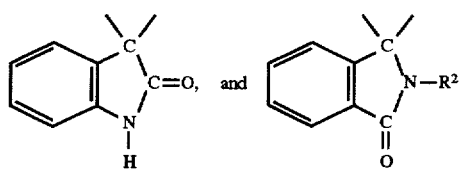

(wherein $R^2$ is a hydrogen atom, or a hydrocarbyl group optionally having a hydroxyl group or an epoxy group).

Examples of the alkylene groups include methylene group, ethylene group, trimethylene group, tetramethylene group, pentamethylene group, hexamethylene group, 2-ethylhexamethylene group, octamethylene group, nonamethylene group and decamethylene group. Examples of the alkylidene group include ethylidene group, n-propylidene group, isopropylidene group, isobutylidene group, n-amylidene group, isoamylidene group, 1-phenylethylidene group and ω-(halodicyclopentadienyl) alkylidene groups. Examples of the divalent alicyclic groups include 1,4-cyclohexylene group, 1,3-cyclohexylene group and cyclohexylidene group. Examples of the alkoxy- or aryloxy-substituted alkylene groups include methoxymethylene group, ethoxymethylene group, ethoxyethylene group, 2-ethoxytrimethylene group, 3-ethoxypentamethylene group, phenoxyethylene group and 2-phenoxytrimethylene group. Examples of the alkoxy- or aryloxy-substituted divalent alicyclic groups include 1,4-(2-methoxycyclohexylene) group and 1,3-(2-phenoxycyclohexylene) group. Examples of the aralkylene groups include phenylethylene group, 2-phenyltrimethylene group, 1,5-diphenylpentamethylene group and 2-phenyldecamethylene group. Examples of the divalent aromatic groups include phenylene group and naphthylene group. Examples of the halogenated aromatic groups include 1,4-(2-chlorophenylene) group and 1,4-(2-fluorophenylene) group. Examples of the divalent alkoxy- or aryloxy-substituted aromatic groups include 1,4-(2-methoxyphenylene) group, 1,4-(2-ethoxyphenylene) group, 1,4-(2-n-propoxyphenylene) group and 1,4-(2-phenoxyphenylene) group. Examples of the alkyl-substituted aromatic groups include 1,4-(2-methylphenylene) group, 1,4-(2-ethylphenylene) group, 1,4-(2-n-propylphenylene) group, 1,4-(2-n-butylphenylene) group and 1,4-(2-n-dodecylphenylene) group.

Alternatively, $R_1$ may also be a polyalkoxy group such as polyethoxy group, polypropoxy group, polythioethoxy group, polybutoxy group and poly(phenylethoxy) group; a silicon-containing group such as poly(dimethylsiloxy) group, poly(diphenylsiloxy) group and poly(methylphenylsiloxy) group; or a group comprising two or more alkylene or alkylidene groups bonded to each other through an aromatic ring, a tertiary amino group (e.g., a divalent alkylamino group), an ether linkage, a carbonyl group, a thioether linkage or a sulfur-containing linkage such as

group.

Further, the polycyclic dihydric aromatic compound represented by the above formula (A-2-1) may a compound having a condnesed (or fused) ring represented by the formula:

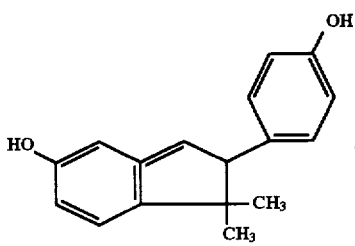

Among these polycyclic dihydric aromatic compounds, those represented by the following formula are particularly preferable:

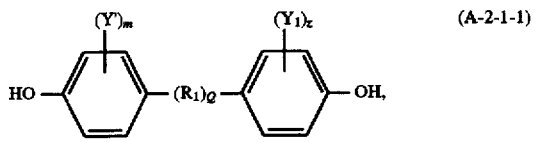

wherein $R_1$, Q, Y' and $Y_1$ are each as defined above; and m and z are each an integer of 0 to 4.

In the above formula (A-2-1-1), $R_1$ is preferably an alkylene group having 1 to 3 carbon atoms, an alkylidene group having 1 to 3 carbon atoms, or a saturated hydrocarbyl group represented by the formula:

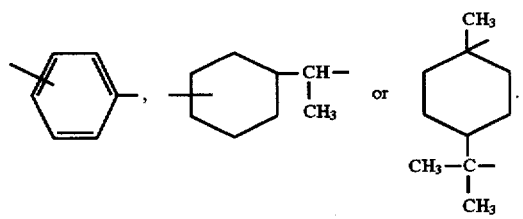

Particular examples of the above polycyclic dihydric aromatic compounds (A-2-1-1) include bis(hydroxyphenyl) alkanes such as 2,2-bis(4-hydroxyphenyl)propane generally called "bisphenol A (trade name)", 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 1,1-bis(3,5-dimethyl-4-hydroxyphenyl)ethane, 1,3-bis(3-methyl-4-hydroxyphenyl)propane, 2,2-bis(3,5-dichloro-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(4-hydroxynaphthyl) propane, 2,2-bis(4-hydroxyphenyl)pentane, 3,3-bis(4-hydroxyphenyl)-pentane, 2,2-bis(4-hydroxyphenyl)heptane, bis(4-hydroxyphenyl)methane, bis(4-hydroxyphenyl) cyclohexylmethane, 1,2-bis(4-hydroxypheny)-1,2-bis (phenyl)propane and 2,2-bis(4-hydroxyphenyl)-1-phenylpropane; dihydroxybiphenyls such as 4,4'-dihydroxybiphenyl, 4,4'-dihydroxyoctachlorobiphenyl, 2,2'-dihydroxybiphenyl and 2,4'-dihydroxybiphenyl; di(hydroxyphenyl) sulfones such as bis(4-hydroxyphenyl) sulfone, 2,4'-dihydroxydiphenyl sulfone, 5-chloro-2,4'-dihydroxydiphenyl sulfone, 5-chloro-4,4'-dihydroxydiphenyl sulfone and 3'-chloro-4,4'-dihydroxydiphenyl sulfone; and di(hydroxyphenyl) ethers such as bis(4-hydroxyphenyl) ether, 4,3'-dihydroxydiphenyl ether, 4,2'-dihydroxydiphenyl ether, 2,2'-dihydroxydiphenyl ether, 4,4'-dihydroxy-2,6-dimethyldiphenyl ether, bis(4-hydroxy-3-isobutylphenyl) ether, bis(4-hydroxy-3-isopropylphenyl) ether, bis(4-hydroxy-3-chlorophenyl) ether, bis(4-hydroxy-3-fluorophenyl) ether, bis(4-hydroxy-3-bromophenyl)ether, bis(4-hydroxynaphthyl) ether, bis(4-hydroxy-3-chloronaphthyl) ether, bis(2-hydroxybiphenyl) ether, 4,4'-dihydroxy-2,6-dimethoxydiphenyl ether and 4,4'-dihydroxy-2,5-diethoxydiphenyl ether. Further, 1,1-bis(4-hydroxyphenyl)-2-phenylethane, 1,3,3-trimethyl-1-(4-hydroxyphenyl)-6-hydroxyindan and 2,4-bis (phydroxyphenyl)-4-methylpentane can also suitably be used as the polycyclic dihydric aromatic compound (A-2-1-1).

Another group of preferable examples of the polycyclic dihydric aromatic compounds include those represented by the following formula:

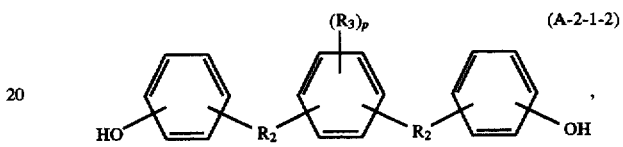

wherein two $R_2$'s may be the same or different from each other and each represents an alkylidene or alkylene group having 1 to 9 carbon atoms; p is an integer of 0 to 4; and $R_3$(s) each represents a methyl group or an ethyl group.

Specific examples of the polycyclic dihydric aromatic compounds (A-2-1-2) include 1,4-bis(4-hydroxybenzyl) benzene, 1,4-bis(4-hydroxybenzyl)tetramethylbenzene, 1,4-bis(4-hydroxybenzyl)tetraethylbenzene, 1,4-bis(p-hydroxycumyl)benzene and 1,3-bis(p-hydroxycumyl) benzene.

Other examples of the polycyclic dihydric aromatic compounds (A-2) include precondensates of 1,1,2,2-tetrakis(4-hydroxyphenyl)ethane phenols with carbonyl compounds (such as phenolic resin precondensate, phenol-acrolein condensate, phenol-glyoxal condensate, phenol-pentanediallyl condensate, resorcinol-acetone condensate and xylene-phenol-formaldehyde precondensate); condensates of phenols with polychloromethylated aromatic compounds (such as phenol-bischloromethylxylene condensate); and so forth.

The polyhydric aromatic alcohol (B) may be prepared by reacting the above polyhydric aromatic compound (A) with an alkylene oxide in the presence of a catalyst accelerating the reaction of a hydroxyl group with an epoxy group. The polyhydric aromatic alcohol (B) has atomic groups of —ROH (wherein R is an alkylene group resulting from an alkylene oxide) and/or —(RO)$_n$H (wherein n is an integer of 2 or above corresponding to the number of oxyalkylene units polymerized; and R's may be the same or different from one another and are each as defined above) bonded to the phenol residue through ether linkage. When two or more —ROH's are bonded to the phenol residue through ether linkage, the two or more —ROH's may be the same or different from one another. When two or more —(RO)$_n$H's are bonded to the phenol residue through ether linkage, the two or more —(RO)$_n$H's may be the same or different from one another. The molar ratio of the alkylene oxide to the polyhydric aromatic compound (A) is at least 1. Preferably, the equivalent ratio of the alkylene oxide to the hydroxyl group of the polyhydric aromatic compound (A) is 1 to 10, particularly 1 to 3.

The alkylene oxide to be used in the above reaction may be, for example, ethylene oxide, propylene oxide, butylene oxide or the like. In particular, it is preferable to use an alkylene oxide which give a side chain (i.e., a branched oxyalkylene group) by the reaction with the polyhydric aromatic compound (A). Examples of such the alkylene oxides include propylene oxide, 1,2-butylene oxide, 2,3-butylene oxide and 2,3-butylene oxide, among which propylene oxide is particularly preferable.

A group of particularly preferable examples of the polyhydric aromatic alcohol (B) include those represented by the following formula:

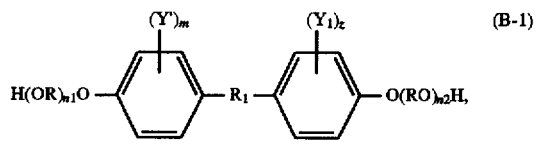
(B-1)

wherein Y', $Y_1$, m, z and $R_1$ are each as defined above for the formula (A-2-1-1); R's may be the same or different from one another and each represents an alkylene group having 2 to 4 carbon atoms; and n1 and n2 may be the same or different from each other and are each an integer of 1 to 3.

Another group of preferable examples of the polyhydric aromatic alcohol (B) include those represented by the following formula:

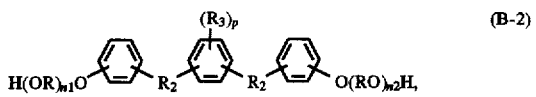
(B-2)

wherein $R_2$, $R_3$ and p are each as defined above for the formula (A-2-1-2); R's may be the same or different from one another and each represents an alkylene group having 2 to 4 carbon atoms; and n1 and n2 may be the same or different from each other and are each an integer of 1 to 3.

Examples of the polyhydric aliphatic alcohols (C) include polyhydric alcohols such as ethylene glycol, propylene glycol, butylene glycol, diethylene glycol, dipropylene glycol, dibutylene glycol, glycerol and pentaerythritol; polyhydoxyl compounds prepared by the addition reaction of these polyhydric alcohols and other active hydrogen containing compounds (such as a compound having an amino group, a compound having a carboxyl group and a compound having a thiohydroxyl (i.e., mercapto) group) with alkylene oxides; polyether polyols and so forth. Alternatively, the polyhydric aliphatic alcohol (C) may be an alicyclic polyol derived from the polyhydric aromatic compound (A) through hydrogenation of the aromatic ring(s). The polyhydric aliphatic alcohol (C) may contain a heteroatom(s) such as nitrogen atom, sulfur atom, oxygen atom in the molecule.

The epihalohydrin (b) is one represented by the following formula:

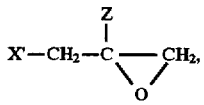

wherein Z represents a hydrogen atom, a methyl group or an ethyl group; and X' is a halogen atom.

Examples thereof include epichlorohydrin, epibromohydrin, 1,2-epoxy-2-methyl-3-chloropropane and 1,2-epoxy-2-ethyl-3-chloropropane.

The acid catalyst accelerating the reaction of the epihalohydrin (b) with the polyhydric aromatic alcohol (B) or the polyhydric aliphatic alcohol (C) may be a Lewis acid such as boron trifluoride, stannic chloride, zinc chloride or ferric chloride; an active derivative thereof (such as boron trifluoride-ether complex); or a mixture of two or more of them.

The basic catalyst accelerating the reaction between the polyhydric aromatic compound (A) and the epihalohydrin (b) may be an alkali metal hydroxide such as sodium hydroxide, an alkali metal alcoholate such as sodium ethylate, a tertiary amine such as triethylamine or triethanolamine, a quaternary ammonium such as tetramethylammonium bromide, or a mixture of two or more of them.

Examples of basic compounds which accelerate the reaction between the polyhydric aromatic compound (A) and the epihalohydrin (b) and, simultaneously, contribute for forming the polyglycidyl ether, or which contribute to the ring closure of the halohydrin ether, which is obtained by the above reaction of the polyhydric aromatic compound (A) with the epihalohydrin (b), through dehydrohalogenation include alkali metal hydroxides such as sodium hydroxide, and alkali metal aluminates such as sodium aluminate.

It is needless to say that these catalysts and basic compounds may be used as such or as solutions in suitable inorganic or organic solvents or mixtures of them.

Examples of the epoxy resins (I-2) include polyglycidyl esters of aliphatic and aromatic polycarboxylic acids, and examples of the aliphatic and aromatic polycarboxylic acids include phthalic acid, isophthalic acid, terephthalic acid, tetrahydrophthalic acid, methyltetrahydrophthalic acid, hexahydrophthalic acid, methylhexahydrophthalic acid, endomethylenetetrahydrophthalic acid, methylendomethylenetetrahydrophthalic acid, maleic acid, fumaric acid, itaconic acid, succinic acid, glutaric acid, adipic acid, pimelic acid, suberic acid, azelaic acid, sebacic acid, aliphatic dimer acids, trimellitic acid, trimesic acid, pyromellitic acid, cyclopentanetetracarboxylic acid, acids prepared by the halogenation of these acids, and carboxy-terminated polyester oligomers prepared by the reaction of these polycarboxylic acids with polyhydric alcohols. Further, the epoxy resin (I-2) also includes epoxy resins obtained by the polymerization of glycidyl methacrylate which is a product of the reaction between the epihalohydrin (b) described above and methacrylic acid.

Examples of the epoxy resin (I-3) include epoxy resins prepared by reacting aromatic amines, such as aniline and aniline derivatives having an alkyl group(s) bonded to the benzen ring of the aniline, with the epihalohydrins (b) described above; and epoxy resins prepared by reacting aromatic amine-aldehyde precondensates, such as an aniline-formaldehyde precondensate and an aniline-phenol-formaldehyde precondensate, with the epihalohydrins (b).

Examples of the epoxidized polyunsaturated compounds and other known epoxy resins to be used in the present invention include epoxidized oils such as epoxidized linseed oil, epoxidized soybean oil, epoxidized safflower oil, epoxidized tung oil, epoxidized perilla oil, epoxidized dehydrated castor oil, epoxidized oiticica oil and epoxidized tall oil; epoxidized fatty acids: epoxidized cyclic olefins such as vinylcyclohexene dioxide, 1-(1-methyl-1,2-epoxyethyl)-3, 4-epoxy-4-methylcyclohexane, 3,4-epoxycyclohexylmethyl 3,4-epoxycyclohexanecarboxylate, 3,4- epoxy-6-methylcyclohexylmethyl 3,4-epoxy-6-methylcyclohexanecarboxylate, bis(3,4-epoxy-6-methylcyclohexylmethyl) adipate, dicyclopentadiene dioxide, dipentene dioxide, tetrahydroindene dioxide, compounds comprising two or more of these rings bonded to each other through groups as defined for —$(R_1)_Q$— in the formula (A-2-1), and Araldite CY-175 (a product of Ciba, trade name); products of epoxidization of conjugated diene polymers such as epoxidized polybutadiene, epoxidized polypentadiene, epoxidized styrene-butadiene copolymer and epoxidized acrylonitrile-styrene copolymer; products of epoxidization of unsaturated bond containing polymers such as epoxidized polypropylene and epoxidized polyisobutene; polyglycidyl ethers of polysiloxanes; and heterocycle containing epoxy resins such as epoxy resins wherein epoxy groups are bonded to oxazolidinone ring through carbon atoms, diglycidyl ether of furan, diglycidyl ether of dioxane, diglycidyl ether of spirobi(m-dioxane), polyepoxy compounds prepared from imidazolines each having a polyunsaturated alkenyl group at 2-position, and triglycidyl isocyanurate. Further, other various known epoxy resins including those described in "Epokishi-Jushi no Seizo to Oyo (Preparation and Application of Epoxy Resins)" (edited by H. Kakiuchi) can also be used in the present invention.

The Mannich base (II) according to the present invention is one prepared by reacting (II-①) an aromatic compound having at least one phenolic hydroxyl group in the molecule with (II-②) a carbonyl compound having at least one carbonyl group in the molecule and (II-③) an amino compound represented by the formula:

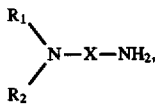

wherein $R_1$ and $R_2$ each represents an alkyl group having 1 to 5 carbon atoms, and X represents an alkylene group having 1 to 5 carbon atoms, at a molar ratio of (II-①)/(II-②)/(II-③) of 1/(0.1 to 3.0)/(0.1 to 3.0), preferably 1/(1.0 to 3.0)/(1.0 to 3.0), and a molar ratio of (II-②)/(II-③) of 1/(1.0 to 2.0), preferably 1/(1.0 to 1.2).

When the above-mentioned three components are used at ratios in the ranges described above, the cured product resulting from the curable epoxy resin composition of the present invention is excellent in amine blushing resistance and water blushing resistance, since the amount of the free amine originated from the Mannich base (II) is small. Further, the curable epoxy resin composition of the present invention is excellent in low-temperature curing characteristics to give a cured product having a strength suitable for practical use, since the Mannich base (II) has a suitable residual primary and/or secondary amino group content.

The above reaction can be conducted by, e.g., adding the carbonyl compound (II-②) to a mixture comprising the aromatic compound (II-①) and the amino compound (II-③) at 80° C. or below, preferably 60° C. or below, heating the resulting mixture to a temperature of 80° to 180° C., preferably 90° to 150° C., and making the mixture components react for 1 to 10 hours while removing the distillate from the reaction system, though the procedure of the reaction is not particularly limited.

The Mannich base (II) according to the present invention may be a reaction product resulting from the above reaction. In other words, the Mannich base (II) may contain at least one among the starting materials, i.e., the aromatic compound (II-①), the carbonyl compound (II-②) and the amino compound (II-③).

The above aromatic compound (II-①) includes monohydric aromatic compounds (II-①-1), preferably monohydric phenols, and polyhydric aromatic compounds (II-②-2), preferably polyhydric phenols. The above aromatic compound (II-①) may be monocyclic or polycyclic, and when it is polycyclic, it may have a condensed ring or ring assemblies. Further, the above aromatic compound (II-①) may have a substituent such as halogen atoms, nitro group, alkyl groups and alkoxyl groups.

Preferable examples of the monohydric aromatic compounds (II-①-1) include those represented by the following formula:

HO—[(Ar)$_n$]—(X)$_m$ wherein n is an integer of 1 or above; Ar is an aromatic ring; m is an integer of from 0 up to a number one smaller than the replacable hydrogen atoms on the aromatic ring(s), i.e., two smaller than the maximum number of the hydrogen atoms on the aromatic ring(s); and X is a halogen atom, an alkyl group or an alkoxyl group; with the proviso that when m is 2 or above, Xs may be the same or different from one another and that when n is 2 or above, Ar's may be the same or different from one another and the hydroxyl group and the X(s) may be bonded to any of the aromatic rings.

In the above formula, the aromatic ring may be a monocyclic one or a condensed one.

The monohydric aromatic compound (II-①-1) of the above formula is one having at least one unsubstituted reactive site, i.e., at least one hydrogen atom, on the aromatic ring(s), and preferable examples of such compounds include not only phenol (carbolic acid) and naphthol but also alkylphenols, halophenols and alkoxyphenols.

Specific examples of the alkylphenols include ortho-, meta- and paracresols, p-tert-butylphenol, octylphenol, nonylphenol, xylenol and ethylphenol.

Specific examples of the halophenols include chlorophenol, while those of the alkoxyphenols include anisole.

Among the monohydric aromatic compounds (II-①-1), phenol and cresol are particularly preferable in practical use.

The polyhydric aromatic compounds (II-①-2) which constitute the other group of preferable examples of the aromatic compounds (II-①) include compounds described above as examples of the polyhydric aromatic compounds (A) in the description on the epoxy resin (I), wherein at least one unsubstituted reactive site is present on the aromatic ring(s).

Among the polyhydric aromatic compounds (II-①-2), a substituted or unsubstituted 2,2-bis(4-hydroxyphenyl) propane having at least one unsubstituted reactive site on the aromatic ring (i.e., the benzen ring) is particularly preferable in practical use.

Other examples of the aromatic compounds (II-①) include monocyclic polyhydric phenols such as resorcinol; and polycyclic polyhydric phenols such as biphenol.

Since an aromatic compound generally has a reactive site on the aromatic ring at a position ortho or para to the phenolic hydroxyl group, it is preferable in the present invention to use an aromatic compound, particularly a phenol, having at least one unsubstituted site, i.e., hydrogen atom, at a position(s) ortho and/or para to the hydroxyl group(s). The reaction product, i.e., the Mannich base (II), obtained by the use of such an aromatic compound is excellent in compatibility with the epoxy resin (I).

The carbonyl compound (II-②) having at least one carbonyl group in the molecule is a compound having at least one —CHO or at least one

in the molecule.

Examples of the carbonyl compounds (II-②) include formaldehyde, paraformaldehyde, crotonaldehyde, acetaldehyde, furfurylaldehyde, adipaldehyde, succinaldehyde, glyoxal and acetone.

A group of preferable examples of the carbonyl compounds (II-②) include aldehydes and reactive derivatives thereof. Specific examples thereof include lower aliphatic aldehydes such as formaldehyde, paraformaldehyde, acetaldehyde and chloral, among which formaldehyde and its reactive derivatives are particularly preferable.

The carbonyl compound may be used as such or as a solution in water or an organic solvent, e.g., methanol, in the preparation of the Mannich base (II).

Examples of the amino compounds (II-③) include dimethylaminopropylamine, diethylaminopropylamine, dibutylaminopropylamine and dimethylaminoethylamine. Among them, dimethylaminopropylamine and diethylaminopropylamine are particularly preferable in practical use. These amino compounds (II-③) can be used not only each alone but also as a mixture of two or more of them.

The whole or part of the above Mannich base (II) may be modified by the addition reaction with an epoxide, Michael addition with a vinyl compound, the Mannich reaction further with a carbonyl compound or the amidation thereof with an organic carboxylic acid.

The curing agent of the present invention is the above-mentioned Mannich base (II). The curing agent is used for curing an epoxy resin at a weight ratio thereof to the epoxy resin of usually 1/100 to 50/100, preferably 3/100 to 40/100.

The curable epoxy resin composition (i) of the present invention comprises the above-mentioned epoxy resin (I) and the above-mentioned Mannich base (II) at a weight ratio of the Mannich base (II)/the epoxy resin (I) of 1/100 to 50/100, preferably 3/100 to 40/100.

When the weight ratio of the Mannich base (II)/the epoxy resin (I) is in the above range, the epoxy resin (I) cures sufficiently to give a cured product excellent in physical properties.

When modified product of the Mannich base (II) is employed, the weight ratio of the Mannich base (II)/the epoxy resin (I) is calculated by the weight of the Mannich base portion of the modifed product.

In the present invention, (IV) an active amino compound having at least two $NH_2$ groups, at least two NH groups, or at least one $NH_2$ group and at least one NH group in the molecule may be used. The active amino compound (IV) is useful for improving the characteristics of a cured product prepared by curing an epoxy resin with the use of the curing agent of the present invention, i.e., the Mannich base (II).

Viewed from another angle, it may be said that the active amino compound (IV) is a curing agent for epoxy resins and the Mannich compound (II) is a curing accelerator or curing catalyst for accelerating the curing (particularly at a low temperature) of the epoxy resins.

The active amino compound (IV) of the present invention may not be particularly limited, as long as it has at least two $NH_2$ groups, at least two NH groups, or at least one $NH_2$ group and at least one NH group in the molecule. In the present invention, preferred are those which are conventionally used as curing agents for epoxy resins. Examples thereof include aliphatic amines such as diethylenetriamine, triethylenetriamine, metaxylylenediamine and hexamethylenediamine; alicyclic amines such as isophoronediamine, dimethylaminocyclohexane and diaminodicyclohexylmethane; and aromatic amines such as diaminodiphenylmethane, diaminodiphenyl sulfone and metaphenylenediamine. They may be used not only each alone but also as a mixture of two or more of them.

The active amino compound (IV) also includes those prepared by modifying the above amines by the addition reaction with an epoxide, Michael addition with a vinyl compound, the Mannich reaction with a carbonyl compound, conversion into an amide or an imidazoline with an organic carboxylic acid or masking modification with a phenol compound. These modified products of the amines may be used each alone, as a mixture of two or more of them, or as a mixture thereof with a non-modified active amino compound (IV).

The curing composition of the present invention comprises the above-mentioned Mannich base (II) and the above-mentioned active amino compound (IV) at a weight ratio of the Mannich base (II)/the active amino compound (IV) of (1 to 30)/(5 to 200), preferably (2 to 20)/(20 to 100). The curing composition is used for curing an epoxy resin at such ratios that the weight ratio of the Mannich base (II)/the epoxy resin (I) is usually 1/100 to 50/100, preferably 3/100 to 40/100, and that the weight ratio of the active amino compound (IV)/the epoxy resin (I) is usually 5/100 to 200/100, preferably 20/100 to 100/100.

The curable epoxy resin composition (ii) of the present invention comprises the above-mentioned epoxy resin (I), the above-mentioned Mannich base (II) and the above-mentioned active amino compound (IV) at such ratios that the weight ratio of the Mannich base (II)/the epoxy resin (I) is 1/100 to 50/100, preferably 3/100 to 40/100, and that the weight ratio of the active amino compound (IV)/the epoxy resin (I) is 5/100 to 200/100, preferably 20/100 to 100/100.

When the weight ratios of the Mannich base (II)/the epoxy resin (I) and the active amino compound (IV)/the epoxy resin (I) are in the above ranges, the epoxy resin (I) cures sufficiently even at a low temperature to give a cured product excellent in resistances to amine blushing and water whitening and physical properties.

When modified product of the active amino compound (IV) is employed, the weight ratio of the active amino compound (IV)/the epoxy resin (I) is calculated by the weight of the active amino compound portion of the modifed product.

The curable epoxy resin compositions (i) and (ii) and the curing composition according to the present invention may further contain a non-reactive diluent such as xylene resin; an aromatic compound such as a phenol as the starting material of the epoxy resin (I); an aliphatic compound such as an alcohol as the starting material of the epoxy resin (I); a solvent for epoxy resins such as benzyl alcohol and water; and a pigment.

The curable epoxy resin compositions (i) and (ii) are usually two-liquid-type compositions. That is, the epoxy resin (I) and, the curing agent [the Mannich base (II)] or the curing composition comprising the Mannich base (II) and the active amino compound (IV) are mixed each other just before the curing of the epoxy resin. Alternatively, the curable epoxy resin composition (ii) may be a three-liquid-type one wherein the epoxy resin (I), the Mannich base (II) and the active amino compound (IV) are separated one another.

EXAMPLES

The present invention will now be described in more detail by referring to the following Examples, though the present invention is not limited to them.

Mannich bases (II) to be used in the Examples were prepared as follows, the Mannich bases (II) being useful as one of the essential components of the present invention.

Mannich base (II-a)

Dimethylaminopropylamine (204.4 g, 2.0 mol) was fed into a flask equipped with a stirrer and a dropping device which could be heated and cooled by an external heater and an external cooler, respectively. Phenol (94.1 g 1.0 mol) was added to the dimethylaminopropylamine under cooling while stirring, and thereafter formalin (i.e., 37% formaldehyde solution) (202.7 g, 2.5 mol of formaldehyde) was dropwise added to the resulting mixture in 60 to 120 minutes while stirring. During the dropwise addition of the formalin, the temperature of the mixture thus obtained was maintained at a temperature in a range of from 30° to 50° C. After the completion of the dropwise addition, a dehydrating device was set on the flask. The temperature of the contents was gradually raised, and the contents was reacted one another at a temperature in a range of from 100° to 150° C. for 5 hours, while water formed by the reaction was distilled off. Then, the reaction was continued at 110° C. under a reduced pressure of 80 mmHg to complete the dehydration reaction. Thus, 328 g of a Mannich base (II-a), which had a viscosity of 68 poise at 25° C. and an amine value of 500 mgKOH/g, was obtained.

Mannich base (II-b)

Diethylaminopropylamine (130.2 g, 1.0 mol) and m-cresol (108.1 g, 1.0 mol) were fed into a flask equipped with a stirrer and a dropping device which could be heated and cooled by an external heater and an external cooler, respectively. Formalin (i.e., 37% formaldehyde solution) (81.1 g, 1.0 mol of formaldehyde) was dropwise added to the resulting mixture in 60 to 120 minutes while stirring. During the dropwise addition of the formalin, the temperature of the mixture thus obtained was maintained at a temperature in a range of from 30° to 50° C. After the completion of the dropwise addition, a dehydrating device was set on the flask. The temperature of the contents was gradually raised, and the contents was reacted one another at a temperature in a range of from 100° to 150° C. for 5 hours, while water formed by the reaction was distilled off. Then, the reaction was continued at 110° C. under a reduced pressure of 90 mmHg to complete the dehydration reaction. Thus, 248 g of a Mannich base (II-b), which had a viscosity of 28 poise at 25° C. and an amine value of 530 mgKOH/g, was obtained.

Example 1

Curing agents (III-1) to (III-3) and curing compositions (V-1) to (V-6) for epoxy resins were prepared by the use of the Mannich bases (II-a) and (II-b) prepared above.

The formulations of the curing agents (III-1) to (III-3) and the curing compositions (V-1) to (V-6) are given in Tables 1 and 2 respectively, and those of the comparative products [i.e., the comparative curing agents (Comp.-1) to (Comp.-3) and the comparative curing compositions (Comp.-4) and (Comp.-5)] are given in Table 3.

TABLE 1

Curing agents (III-1) to (III-3) for epoxy resins

| Curing agent | (wt %) | | |
|---|---|---|---|
| | III-1 | III-2 | III-3 |
| Mannich base (II-a) | 100 | | 65 |
| Mannich base (II-b) | | 100 | |
| benzyl alcohol | | | 15 |
| ACR epoxy R-82*¹ | | | 5 |
| phenol | | | 7 |
| nonylphenol | | | 8 |

*¹ACR epoxy R-82: Bisphenol-type epoxy resin, epoxy equivalent weight of 190.

TABLE 2

Curing compositions (V-1) to (V-6) for epoxy resins

| Curing composition | (wt %) | | | | | |
|---|---|---|---|---|---|---|
| | V-1 | V-2 | V-3 | V-4 | V-5 | V-6 |
| ACR hardener H-3258 X*² | 90 | 90 | | | | |
| ACR hardener H-3895*³ | | | 85 | | | |
| ACR hardener H-280*⁴ | | | | 90 | 50 | 20 |
| Mannich base (II-a) | 10 | | 15 | 10 | 50 | 80 |
| Mannich base (II-b) | | 10 | | | | |

*²ACR hardener H-3258 X: aliphatic amine modified by the Mannich reaction, amine value of 330 mg KOH/g.
*³ACR hardener H-3895: modified alicyclic amine, amine value of 280 mg KOH/g.
*⁴ACR hardener H-280: modified polyamide amine, amine value of 300 mg KOH/g.

TABLE 3

Comparative products (comparative curing agents and comparative curing compositions) for epoxy resins

| Curing agent or composition | (wt %) | | | | |
|---|---|---|---|---|---|
| | Comp.-1 | Comp.-2 | Comp.-3 | Comp.-4 | Comp.-5 |
| ACR hardener H-3258 X | 100 | | | 95 | 90 |
| ACR hardener H-3895 | | 100 | | | |
| ACR hardener H-280 | | | 100 | | |
| 2,4,6-tris(dimethyl-aminomethyl)phenol | | | | 5 | 10 |

Test-1

The curing agents (III-1) to (III-3) and (Comp.-1) were subjected to the following performance tests. The test results are given in Table 4.

Gelation time

ACR epoxy R-82 and a curing agent were put into a 200-ml glass made of paper at 23° C. at such a ratio as shown in Table 4 and mixed each other to prepare a curable epoxy resin composition. The curable epoxy resin composition had a weight of 100 g. The state of the curable epoxy resin composition was observed at 23° C. The gelation time was defined as the period of time from the initiation of the mixting to the time when the curable epoxy resin composition lost its fluidity.

Curing characteristics of film

The curable epoxy resin composition prepared above for the determination of the gelation time thereof was spread on a tin plate as thin as 0.3 mm to be a film thickness of 60 μm, followed by curing at 5° C. for 16 hours. After the curing, the film thus prepared was left at 23° C. for 15 minutes and then evaluated according to the following criterion:

E: the composition has cured to be a film with little tack on the surface thereof, G: the composition has semicured to be a film with a little tack on the surface thereof, and P: the composition has uncured and a film is not formed.

Hardness

Shore-D hardness was determined according to JIS K-5400. Specially, the curable epoxy resin composition prepared above for the determination of the gelation time thereof was poured into a mold at 5° C. to be a size of 50 mm×50 mm×3 mm and to have a smooth surface. Then, the curable epoxy resin composition was left at 5° C. for a predetermined period of time to cure. After the curing, the cured product was left at 23° C. for 20 minutes and then Shore-D hardness of the cured product was determined.

Amine blushing resistance

The curable epoxy resin composition prepared above for the determination of the gelation time thereof was spread on a tin plate as thin as 0.3 mm to be a film thickness of 60 μm, followed by curing at 5° C. for 24 hours. After the curing, the state of the film thus prepared was observed. Specially, the whitening of the film (i.e., amine blushing) caused by the bleeding of the amine component contained in the composition, the precipitaion of the carbonate of the amine, and so on was obserbed and evaluated according to the following criterion:

○: amine blushing has not been caused, and the film is transparent and has brightness, Δ: partial amine blushing has been caused, but the film retains brightness, x: amine blushing has been caused over the whole surface of the film, though the film retains brightness, and xx: amine blushing has remarkably been caused over the whole surface of the film and the film loses the brightness.

Water whitening resistance

The film was prepared in the same manner as that for preparing the film for the test of the amine blushing resistance. After the curing, 4 or 5 drops of water was added onto the film. The film was left under such the condition for 2 hours, and then the water droppings were removed therefrom. Thereafter, the surface on the film was evaluated according to the following criterion:

○: the film is normal,

Δ: light whitening is observed at a part of the sites where the water droppings was present, but the film retains brightness, x: light whitening (including white turbidity) is observed over the whole surface and the film loses the brightness, and xx: whitening is observed over the whole surface, in other words, it seems that white materials have precipitated on the film.

Chemical resistance

The curable epoxy resin composition prepared above for the determination of the gelation amine thereof was poured into a mold at room temperatures to be a size of 20 mm×20 mm×1 mm. Then, the curable epoxy resin composition was left at room temperatures for 7 days to cure. After the curing, the cured product was weighed, and then immersed in a 10% aqueous NaOH solution, a 10% aqueous HCl solution or a 10% aqueous $H_2SO_4$ solution for 7 days. The cured product taken out the above aqueous solution was weighed. The weight change caused by the immersion was determined, and expressed in terms of rate of weight change based on the weight of the cured resin before the immersion. For example, "0.05" means a weight increase of 0.05% based on the weight before the immersion.

TABLE 4

(parts by weight)

| Test No. | III-1 | III-2 | III-3 | Comp.-1 |
|---|---|---|---|---|
| ACR epoxy R-82 | 100 | 100 | 100 | 100 |
| Curing agent | | | | |
| III-1 | 25 | | | |
| III-2 | | 25 | | |
| III-3 | | | 40 | |
| Comp.-1 | | | | 40 |
| Gelation time 100 g (23° C.) | 10 min | 12 min | 15 min | 25 min |
| Curing characteristics of film of 60 μm thick (after 16 hours at 5° C.) | E | E | E | G-P |
| Shore-D hardness | | | | |
| (after 16 hours at 5° C.) | 68 | 62 | 73 | 25 |
| (after 48 hours at 5° C.) | 84 | 83 | 83 | 68 |
| (after 7 days at 5° C.) | 85 | 85 | 85 | 80 |
| Amine blushing resistance (after 24 hours at 5° C.) | ○ | ○ | ○ | Δ |
| Water whitening resistance (after 24 hours at 5° C.) | ○ | ○ | ○ | x |
| Chemical resistance | | | | |
| 10% NaOH | 0.05 | 0.08 | 0.08 | 0.30 |
| 10% HCl | 0.10 | 0.13 | 0.17 | 0.30 |
| 10% $H_2SO_4$ | 0.15 | 0.20 | 0.20 | 0.40 |

Test-2

The curing compositions (V-1) to (V-6), the curing agents (Comp.-1) to (Comp.-3) and the curing compositions (Comp.-4) and (Comp.-5) were subjected to the performance tests described in the above Test-1, and the following cross-cut adhesion test and cellophane tape test. The test results are given in Table 5.

Cross-cut adhesion test

Cross cut adhesion test was conducted according to JIS K-7215. Specially, ACR epoxy R-82 was mixed with a curing composition or a curing agent at such a ratio as shown in Table 5 to prepare a curable epoxy resin composition. The curable epoxy resin composition was spread on a tin plate as thin as 0.3 mm to be a film thickness of 100 μm, followed by curing at 5° C. for 7 days. After the curing, the film thus prepared was cut with a cutter knife at intervals of 1 mm to give 100 squares each having a size of 1 mm×1 mm. The squares adhered to the tin plate without peeling off therefrom were counted.

When the number of the squares adhered is 100 or close to 100, the film is evaluated to be excellent in film properties.

Cellophane tape test

After the count of the squares adhered in the above cross cut adhesion test, cellophane tape was applied onto the film. Then, the cellophane tape was peeled off. The squares adhered to the tin plate without peeling off therefrom were counted.

When the number of the squares adhered is large, the film is excellent in its properties.

TABLE 5

| Test No. | | Comp.-1 | V-1 | V-2 | Comp.-4 | Comp.-5 | Comp.-2 | V-3 | Comp.-3 | V-4 | V-5 | V-6 (parts by weight) |
|---|---|---|---|---|---|---|---|---|---|---|---|---|
| ACR epoxy R-82 | | 100 | 100 | 100 | 100 | 100 | 100 | 100 | 100 | 100 | 100 | 100 |
| Curing agent or composition (Comparative product) | Comp.-1 | 40 | | | | | | | | | | |
| | Comp.-2 | | | | | | 40 | | | | | |
| | Comp.-3 | | | | | | | | 80 | | | |
| | Comp.-4 | | | | 40 | | | | | | | |
| | Comp.-5 | | | | | 40 | | | | | | |
| Curing composition (Invention product) | V-1 | | 40 | | | | | | | | | |
| | V-2 | | | 40 | | | | | | | | |
| | V-3 | | | | | | | 50 | | | | |
| | V-4 | | | | | | | | | 70 | | |
| | V-5 | | | | | | | | | | 50 | |
| | V-6 | | | | | | | | | | | 30 |
| Gelation time (min) (100 g, 23° C.) | | 25 | 10 | 14 | 12 | 10 | 60 | 30 | 100 | 80 | 30 | 25 |
| Curing characteristics of film of 60 μm thick (after 16 hours at 5° C.) | | G-P | E-G | G | G | E-G | P | G | P | G-P | E-G | E |
| Cross-cut adhesion test (after 7 days at 5° C.) | | 100 | 100 | 100 | 85 | 28 | 100 | 100 | 100 | 100 | 100 | 100 |
| Cellophane tape test (after 7 days at 5° C.) | | 100 | 100 | 100 | 0 | 0 | 85 | 100 | 100 | 100 | 100 | 92 |
| Shore-D hardness | after 16 hours at 5° C. | 25 | 45 | 38 | 38 | 45 | immeasurable | 20 | immeasurable | 10> | 60 | 67 |
| | after 48 hours at 5° C. | 68 | 82 | 80 | 80 | 82 | 50 | 72 | 50 | 67 | 82 | 84 |
| | after 7 days at 5° C. | 80 | 84 | 83 | 82 | 82 | 65 | 72 | 35 | 78 | 83 | 85 |
| Amine blushing resistance (after 24 hours at 5° C.) | | △ | ○ | ○ | XX | XX | △ | ○ | XX | △ | ○ | ○ |
| Water whitening resistance (after 24 hours at 5° C.) | | X | ○ | ○ | XX | XX | XX | ○ | XX | △ | ○ | ○ |
| Chemical resistance | 10% NaOH | 0.30 | 0.15 | 0.15 | 0.30 | 0.40 | 0.28 | 0.10 | 0.50 | 0.40 | 0.30 | 0.05 |
| | 10% HCl | 0.30 | 0.15 | 0.20 | 0.35 | 0.42 | 0.30 | 0.20 | 1.10 | 0.85 | 0.55 | 0.15 |
| | 10% $H_2SO_4$ | 0.40 | 0.20 | 0.20 | 0.48 | 0.65 | 0.38 | 0.28 | 1.80 | 1.30 | 0.70 | 0.20 |

Example 2

Curing compositions (Vw-1) to (Vw-3) for water-based epoxy resins were prepared by the use of the Mannich base (II-a) prepared above.

The formulations of the curing compositions (Vw-1) to (Vw-3) and those of the comparative products [i.e., the comparative curing compositions (Comp.-6) and (Comp.-7)] are given in Table 6.

TABLE 6

Curing compositions (Vw-1) to (Vw-3), (Comp.-6) and (Comp.-7) for water-based epoxy resins

| | (parts by weight) | | | | |
|---|---|---|---|---|---|
| Curing composition | Comp.-6 | Comp.-7 | Vw-1 | Vw-2 | Vw-3 |
| ACR hardener H-4121*5 | 100 | 95 | 95 | 93 | 50 |
| Mannich base (11-a) | | | 5 | 7 | 4 |
| 2,4,6-tris(dimethylamino-methyl)phenol | | 5 | | | |

*5 ACR hardener H-4121: water dispersion type curing composition comprising self-emulsifiable aliphatic amine, solid content: 80%

Test

The curing compositions (Vw-1) to (Vw-3), (Comp.-6) and (Comp.-7) were subjected to the following performance tests. The test results are given in Table 7.

Pot life

The epoxy resin (ACR epoxy R-82 or ACR EM-26-60) was mixed with a curing composition and water at such a ratio as shown in Table 7 to prepare a water-based curable epoxy resin composition. The water-based curable epoxy resin composition was spread on a glass plate as thin as 1 mm to be a film thickness of 30 μm, followed by curing at 23° C. for 16 hours. This operation was conducted at 0.5-hour intervals. When the curable epoxy resin composition cured and the film thus prepared was transparent and had brightness, the curable epoxy resin composition was judged to be usable. While when the curable epoxy resin composition cured but the film thus prepared was turbid and whitish, the period of time from the initiation of the mixing of the components to the time when the curable epoxy resin composition which provided the turbid and whitish film was spread thereon was defied as "pot life".

Curing characteristics of film

The water-based curable epoxy resin composition prepared above for the determination of the pot life thereof was spread on a tin plate as thin as 0.3 mm to be a film thickness of 30 μm, followed by curing at 5° C. for 16 hours. After the curing, the film thus prepared was left at 23° C. for 15 minutes and then evaluated according to the criterion described above for curing characteristics of film in Example 1.

Cross-cut adhesion test

Cross cut adhesion test was conducted in the same manner as that in Example 1, except that the curable epoxy resin composition was cured at 10° C. for 7 days.

Cellophane tape test

Cellophane tape test was conducted in the same manner as that in Example 1, except that the curable epoxy resin composition was cured at 10° C. for 7 days.

TABLE 7

| | (parts by weight) | | | | |
|---|---|---|---|---|---|
| Test No. | Comp.-6 | Comp.-7 | Vw-1 | Vw-2 | Vw-3 |
| ACR epoxy R-82 | 100 | 100 | 100 | 100 | |
| ACR EM-26-60*5 | | | | | 100 |
| Curing composition | | | | | |
| Comp.-6 | 100 | | | | |
| Comp.-7 | | 100 | | | |
| Vw-1 | | | 100 | | |
| Vw-2 | | | | 100 | |
| Vw-3 | | | | | 54 |
| water | 100 | 100 | 100 | 100 | 60 |
| Pot life (hour) | 3.0 | 1.0 | 2.5 | 2.0 | 2.0 |
| Curing characteristics of film of 30 μm thick (after 16 hours at 5° C.) | P | P-G | G | E | E |
| Cross-cut adhesion test (after 7 days at 10° C.) | 100 | 70 | 100 | 100 | 100 |
| Cellophane tape test (after 7 days at 10° C.) | 100 | 20 | 100 | 100 | 100 |

*6 ACR EM-26-60: an epoxy resin emulsion comprising bisphenol-A diglycidyl ether, epoxy resin content of 60%, epoxy equivalent weight of 215.

As is apparent from the results given in Tables 4, 5 and 7, the curable epoxy resin compositions of the present invention are excellent in low-temperature curing characteristics, while the cured products of the curable epoxy resin compositions maintain the performances (hardness, amine blushing resistance, water whitening resistance, chemical resistance, etc.) that the cured products in the prior art exhibit. Thus, according to the present invention, the curing time of the epoxy resin composition can be shortened.

What we claim is:

1. A curable epoxy resin composition comprising:

an epoxy resin having more than one epoxy groups per one molecule, and a Mannich base prepared by reacting (II-①) an aromatic compound having at least one phenolic hydroxyl group in the molecule, with (II-②) a carbonyl compound having at least one carbonyl group in the molecule, and (II-③) an amino compound represented by the formula:

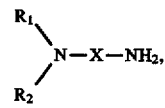

wherein $R_1$ and $R_2$ each represents an alkyl group having 1 to 5 carbon atoms, and X represents an alkylene group having 1 to 5 carbon atoms, at a molar ratio of (II-①)/(II-②)/(II-③) of 1/(0.1 to 3.0)/(0.1 to 3.0) and a molar ratio of (II-②)/(II-③) of 1/(1.0 to 2.0);

wherein the amount of the Mannich base is 1 to 50 parts by weight per 100 parts by weight of the epoxy resin.

* * * * *